United States Patent [19]
Carpenter et al.

[11] Patent Number: 5,743,143
[45] Date of Patent: Apr. 28, 1998

[54] TRANSMISSION SHIFTING MECHANISM AND POSITION SENSOR

[75] Inventors: Jeffrey L. Carpenter, Kalamazoo; Mark L. Lanting, Portage; Michael J. Huggins; David L. Wadas, both of Kalamazoo, all of Mich.

[73] Assignee: Eaton Corporation, Cleveland, Ohio

[21] Appl. No.: 695,052

[22] Filed: Aug. 9, 1996

[51] Int. Cl.$^6$ .................. F16H 59/04; F16H 63/42; G01B 7/00
[52] U.S. Cl. .............. 74/335; 74/473 R; 74/DIG. 7; 324/207.16; 324/207.24; 324/207.26; 340/456
[58] Field of Search ................. 74/335, 473 R, 74/89.15, DIG. 7; 324/207.16, 207.24, 207.26; 340/456

[56] References Cited

U.S. PATENT DOCUMENTS

| 3,961,243 | 6/1976 | Schulz | 324/207.19 |
|---|---|---|---|
| 4,592,249 | 6/1986 | Lehmann et al. | 74/DIG. 7 |
| 4,614,126 | 9/1986 | Edelen | 74/333 |
| 4,649,341 | 3/1987 | Ulbrich et al. | 324/654 X |
| 4,873,881 | 10/1989 | Edelen | 74/336 |
| 4,899,607 | 2/1990 | Stainton | 74/335 |
| 4,920,815 | 5/1990 | Reynolds | 74/335 |
| 4,944,194 | 7/1990 | Tanoue et al. | 74/335 |
| 4,945,484 | 7/1990 | Cote | 364/424.1 |
| 4,974,468 | 12/1990 | Reynolds | 74/477 |
| 5,107,211 | 4/1992 | Rose | 324/207.16 |
| 5,111,139 | 5/1992 | Rose | 324/207.22 |
| 5,390,561 | 2/1995 | Stine | 74/331 |
| 5,428,290 | 6/1995 | Porcher | 324/207.16 |
| 5,435,212 | 7/1995 | Menig | 74/745 |
| 5,566,579 | 10/1996 | Willford et al. | 340/456 X |
| 5,578,904 | 11/1996 | Marcott et al. | 324/207.16 |

FOREIGN PATENT DOCUMENTS

| 0373273 | 6/1990 | European Pat. Off. . | |
| 0636819 | 2/1995 | European Pat. Off. . | |
| 0651185 | 5/1995 | European Pat. Off. . | |
| 2581002 | 10/1986 | France . | |
| 4236228 | 4/1994 | Germany | 340/456 |
| 58-170954 | 10/1983 | Japan | 74/DIG. 7 |
| 2277784 | 9/1994 | United Kingdom | 74/DIG. 7 |

*Primary Examiner*—Allan D. Herrmann
*Attorney, Agent, or Firm*—Howard D. Gordon

[57] ABSTRACT

A transmission shifting mechanism (10) and position sensor assembly. The shifting mechanism includes a member (32) of known flux-conducting or flux-insulating properties movable therewith, which will variably extend (42, 44, 46) into an electric coil (36), which is periodically charged and then allowed to discharge. The rate of discharge is variable with the position of the member in the coil and, thus, provides a signal indicative to mechanism condition (H, N, L).

6 Claims, 6 Drawing Sheets

Fig.6B ized as a variable, effective
5,743,143

TRANSMISSION SHIFTING MECHANISM AND POSITION SENSOR

BACKGROUND OF THE INVENTION

1. Related Applications

This application is related to U.S. patent applications Ser. No. 08/649,827, filed Apr. 30, 1996, now U.S. Pat. No. 5,651,292 entitled SPLITTER SHIFT MECHANISM AND CONTROL, and Ser. No. 08/679,879, filed Jul. 15, 1996, entitled CONTROL MODULE, both assigned to EATON CORPORATION, the assignee of this application.

2. Field of the Invention

The present invention relates to a transmission shifting mechanism and a sensor assembly for sensing positions of the transmission shifting mechanism member or members corresponding to selected and/or engaged conditions of various transmission ratios and for providing output signals indicative thereof. In particular, the present invention relates to a transmission shifting mechanism combined with a non-contacting sensor assembly for sensing the axial and/or rotational position of one or more transmission shifting members and for providing a signal or signals indicative thereof.

3. Description of the Prior Art

Manual and fully or partially automated mechanical transmission systems for vehicular usage are well known in the prior art, as may be seen by reference to U.S. Pat. Nos. 4,595,986; 4,754,665; 4,850,236; 4,974,468; 5,390,561; 5,435,219; 5,441,463; 5,489,247 and 5,506,771, the disclosures of which are incorporated herein by reference.

Shifting mechanisms for vehicular manual and automated mechanical transmissions usually have consisted of shift bar housing assemblies having single or multiple axially movable parallel shift bars, axially and rotationally movable single shaft shifting mechanisms and/or associated X-Y shift actuators, examples of which may be seen by reference to U.S. Pat. Nos. 4,873,881; 4,899,607; 4,920,815; 4,945,484; 5,315,218 and 5,481,170, the disclosures of which are incorporated herein by reference.

Especially for fully or partially automated mechanical transmission systems, effective control often requires sensing the engaged and/or selected ratio(s) which, due to space and other considerations, was implied from the position of the transmission shifting mechanism. The prior art devices for sensing shift mechanism positions were not totally satisfactory, as they were contact-type devices, were unreliable, expensive to provide, assemble and/or maintain and/or required a separate sensor to sense each monitored axial or rotational position of a monitored shift mechanism member.

SUMMARY OF THE INVENTION

In accordance with the present invention, the drawbacks of the prior art are minimized or overcome by the provision of a shifting mechanism combined with a relatively simple and inexpensive non-contacting sensor assembly which will provide an output signal, the magnitude or rate of change of magnitude of which is indicative of at least two, preferably at least three or more distinct axial or rotational positions of a monitored shift mechanism member, each of said positions corresponding to a known engagement or selection condition of the transmission.

The foregoing is accomplished by providing a coil located such that axial and/or rotational movement of the monitored shift mechanism member will cause a variable, effective amount of magnetically conductive material to be present in the coil's interior bore. The coil is periodically charged to a known voltage and then allowed to discharge. The rate of discharge or "decay" of the charged coil is proportional to the effective amount of magnetically conductive material present in the coil bore and, thus, by measuring or otherwise determining the voltage at a given time after charging the coil, or the rate of change of voltage, the position of the monitored shift mechanism member may be determined.

Accordingly, it is an object of the present invention to provide a new and improved transmission shift actuator and position sensor assembly combination.

This and other objects and advantages of the present invention will become apparent from a reading of the following description of the preferred embodiment taken in connection with the attached drawings.

DESCRIPTION OF THE PREFERRED EMBODIMENT

Figure 1:
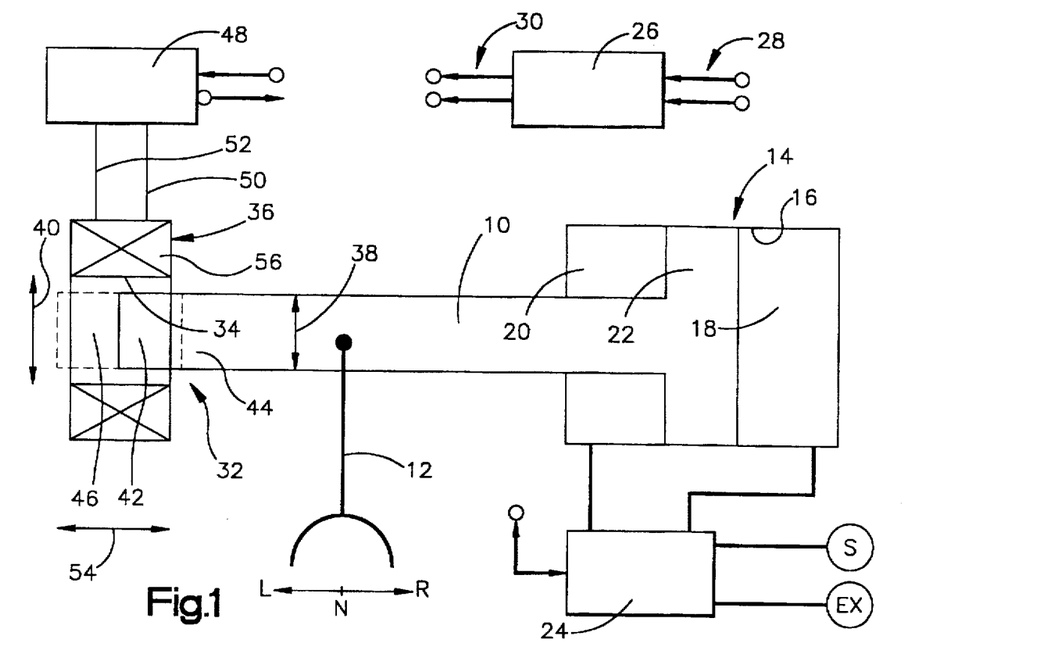
FIG. 1 is a schematic illustration of a first embodiment of the present invention.
Figure 2:
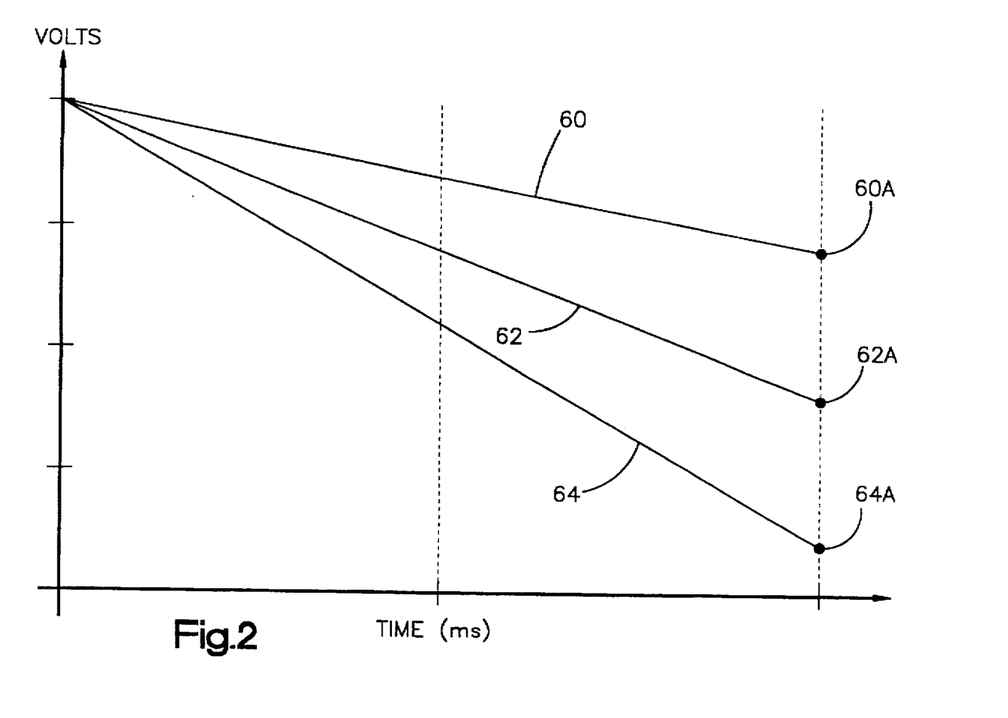
FIG. 2 is a graphical representation of the output signals from the position sensor assembly of FIG. 1.

A schematic illustration of the transmission actuator member and position sensor assembly combination of the present invention may be seen by reference to FIGS. 1 and 2. The monitored transmission shift actuator member is illustrated as a shaft 10 carrying a shift fork or shift yoke 12 for axial movement therewith for positioning a clutch member (not shown) in a selected one of a high-ratio-engaged (H), neutral (N) or low-ratio-engaged (L) position. The shaft 10 and shift fork 12 are selectively axially positioned by means of an actuator piston assembly 14 comprising a cylinder 16 divided into a first and second chamber 18 and 20, respectively, by a piston member 22 slidably and sealingly received therein. Piston member 22 is integral with and/or axially fixed to shaft 10.

A valving mechanism 24 is provided to selectively connect actuator chambers 18 and 20 to a source of pressurized fluid (S) or to exhaust (Ex). Shift actuators of this general type are well known in the prior art and may be seen by reference to U.S. Pat. Nos. 4,928,544; 5,222,404; 5,224,392 and 5,231,895, the disclosures of which are incorporated herein by reference. Valve assembly 24 may comprise one or more solenoid-controlled valves or the like and may be subject to pulse width modulation control, especially to provide the neutral position of the shift fork 12. Alternatively, a control of the type discussed in aforementioned copending U.S. pat. app. Ser. No. 08/649,827, the disclosure of which is incorporated herein by reference, may be utilized.

The control valve assembly 24 may provide input signals to and operate in response to command output signals from a microprocessor-based control unit 26, which receives input signals 28 and processes same in accordance with predetermined logic rules to issue command output signals 30 to various system actuators such as the valve assembly 24. Controllers of this type are well known in the prior art, as may be seen by reference to U.S. Pat. Nos. 4,361,060 and 4,595,986, the disclosures of which are incorporated herein by reference.

The shift member or shaft 10 of the embodiment of FIG. 1, at at least the leftward end 32 thereof, is of a flux-conducting ferromagnetic material, such as steel or the like. The shaft 10 generally is coaxial with the interior bore 34 of an electric coil member 36 and is of a smaller outer diameter 38 than the inner diameter 40 of coil bore 34 for non-contacting receipt in and/or passage therethrough.

Numeral 42 illustrates the position of the leftward end 32 of the shaft 10 in the neutral position of shift fork 12, while numerals 44 and 46 illustrate in dotted line the respective positions of the end of the shaft when the shaft is in the low and high positions of the shift fork 12.

A voltage regulator and measuring device 48 provides signals to and receives command signals from the processing unit 28. The voltage regulating device is effective to charge the coil to a predetermined voltage and to measure the voltage drop, or a related electrical quantity across the coil leads 50 and 52 and to provide output signals to the control unit indicative thereof. The voltage regulating and measuring device is connected to a source of electrical power (not shown).

In a typical example, for a heavy-duty transmission, the diameter 38 of shaft 10 may be about ⅝ inch, the interior diameter of bore 34 may be about ⅞ to 1 inch, and the length 54 of the bore 34 may be about 1 to 1¼ inches. The bobbin 56 of the coil 36 may be of a copper wire, such as 32-gauge copper wire, and may have a large plurality of turns, such as about 3,000 turns, which will provide about 160 ohms of DC resistance. The foregoing dimensions and specifications are by way of example only and are not intended to be limiting.

In operation, to provide a signal indicative of the axial position of the shift fork 12, the voltage unit 48 is periodically caused to charge the coil 36 and then to allow the coil to discharge, while taking periodic measurements of the voltage drop across the leads 50 and 52. As is known, the rate of discharge or decay of the voltage across the leads will be directly proportional to the extension of ferromagnetic material within the bore 34. Accordingly, the decay rate across the coil leads will be greater with the shift fork in the low position than the neutral position and greater when in the neutral position than in the high position.

The basic relationships are well known and are expressed by the expressions:

$$T=L/R$$

$$L=N^2/R \text{ and}$$

$$V_{DECAY\ RATE}=(V_{INITIAL})/T$$

where:

t=time
T=L/R
R=reluctance
L=inductance
N=number of turns on coil
$V_{DECAY\ RATE}$=rate of coil discharge; and
$V_{INITIAL}$=initial charge of coil.

Referring to FIG. 2, which is a schematic illustration of the voltage drop across the coil leads, line 60 represents the expected voltage drop with the shift fork in the high position, and line 62 represents the expected voltage drop with the shift fork in the neutral position, while line 64 represents the expected voltage drop with the shift fork in the low position. It is understood that the actual voltage values are not as linear as symbolically illustrated in FIG. 2. To determine the position of the shift fork 12, a value of the voltage across the coil may be read at a predetermined time (t) after initiation of the discharge of the coil and compared to the expected values 60A, 62A and 64A thereof and/or the rate of change in the magnitude of voltage across the leads 50 and 52 may be sensed and/or determined. By way of example, it has been found that an accurate indication of the position of a shift shaft of the type described above and shift fork carried thereby may be sensed by charging a coil of the type described above to about 5 volts and then permitting the coil to discharge for about 2 milliseconds.

In a preferred embodiment, the coil discharge trips a voltage comparator, the comparator converts the decay rate into a pulse width signal and the width of the pulse is the actual variable imputed into the high-speed input of a microprocessor.

Figure 3A:
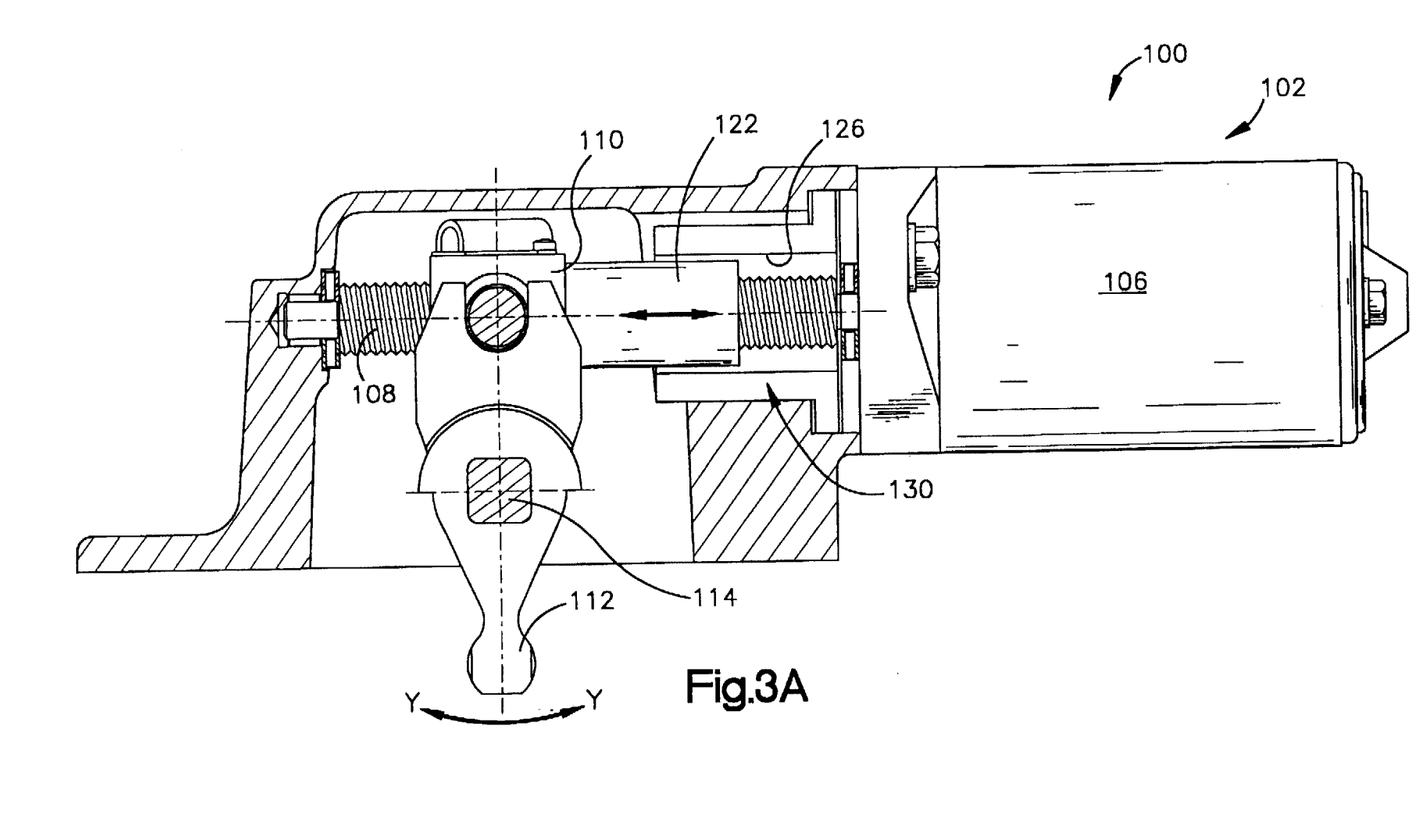
FIG. 3A is a plan view, partially in section, of a second embodiment of the present invention as utilized in the Y—Y portion of an X-Y shifting mechanism.
Figure 3B:
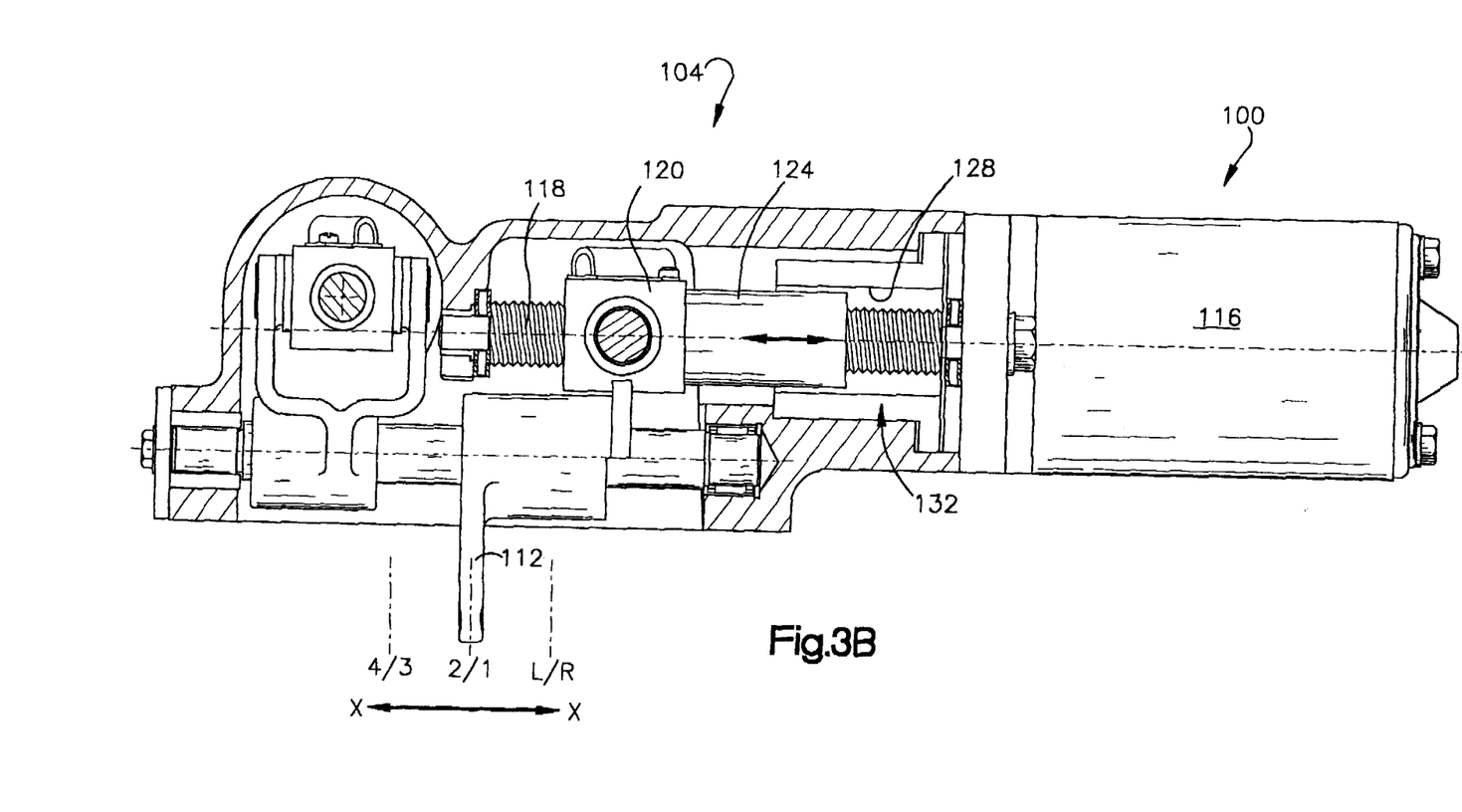
FIG. 3B is a plan view, partially in section, of a second embodiment of the present invention as utilized in the X—X portion of the X-Y shifting mechanism of FIG. 3A.
Figure 4:
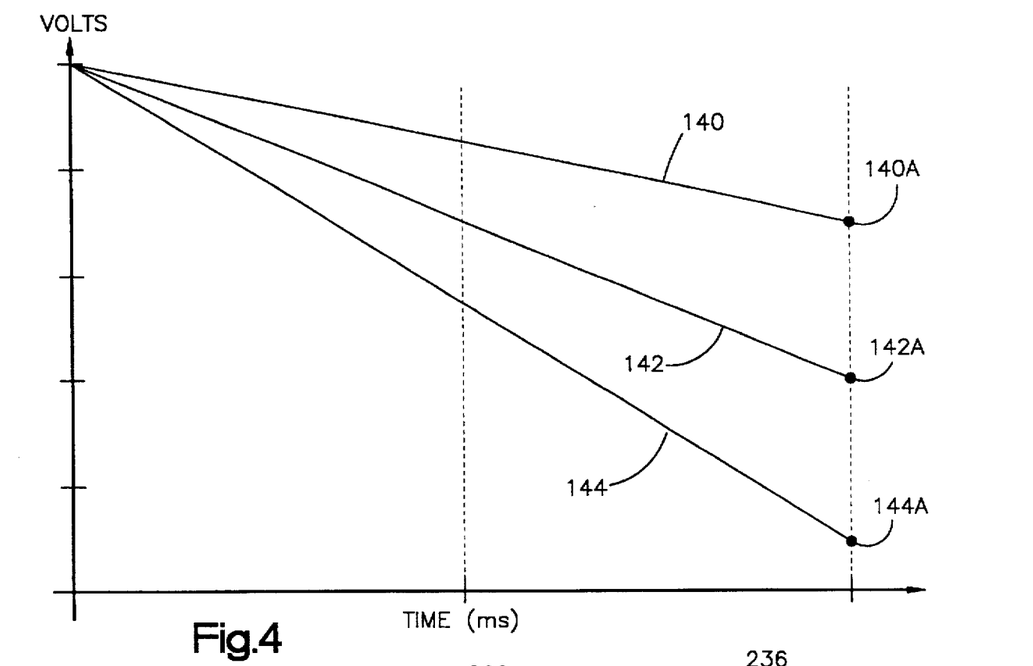
FIG. 4 is a graphical representation, similar to FIG. 2, of the output signals from the sensor assemblies of FIGS. 3A and 3B.

A further embodiment of the present invention as utilized with an electric motor-actuated X–Y shifting mechanism may be seen by reference to FIGS. 3A, 3B and 4. Both pressurized fluid- and electric motor-actuated X–Y shifting mechanisms are well known in the prior art, as may be seen by reference to aforementioned U.S. Pat. Nos. 4,873,881; 4,899,607; 5,315,218 and 5,481,170. The purpose of these mechanisms is to move a shift finger first in the X—X or selection direction to select operation of a desired shift rail or shift fork, and then in the Y—Y or engagement direction to cause engagement or disengagement of a selected clutch member.

The illustrated X–Y shifting mechanism 100 comprises two generally perpendicular portions, a Y—Y or engagement/disengagement portion illustrated in cross-section in FIG. 3A, and an X—X or selection portion 104 illustrated in cross-section in FIG. 3B. In the engagement portion 102, an electric motor 106 is effective to cause the clockwise or counterclockwise rotation of a metallic lead screw 108, which carries a ball nut member 110 thereon. The shift finger 112 is pivoted about a pivot member 114 whereby rightward and leftward axial movement of the ball nut 110 will cause an opposite arcuate axial movement in the Y—Y direction of the free end of the shift finger 112 to selectively cause engagement and/or disengagement of a controlled clutch member. In FIG. 3B, a second independently controllable electric motor 116 rotates a second metallic lead screw 118, which carries a second ball nut 120 for axially moving the shift finger 112 to one of three selectable positions, namely, a position for engagement of the low and reverse ratios (L/R), a position for engagement of the second and first speed ratios (2/1), and a position for engagement of the fourth and third speed ratios (4/3).

Each of the ball nuts, 110 and 120, carries a sleeve of flux shielding or masking material, such as aluminum sleeves 122 and 124, respectively, for axial movement therewith. The sleeves 122 and 124 are sized for telescopic receipt on lead screws 108 and 118, respectively, and for non-contacting receipt within the interior bores 126 and 128, respectively, of coil members 130 and 132, respectively, each of which are substantially structurally and functionally identical to the coil 36 described above.

Briefly, increased axial insertion of the aluminum masking tube-like sleeves into the bores of the coils will effectively diminish the effect of the flux-conductive metallic ball screws, which are permanently within the bores of the coils and, thus, a signal indicative of the magnitude or rate of decay of voltage in a charged-then-discharging coil will be indicative of the axial position of the ball nut monitored thereby. The operation of the coils is substantially identical to that described above, except that the rate of decay will increase with increased insertion of the masking sleeve into the bore of the coil. By way of example, referring to FIG. 4, lines 140, 142 and 144 represent the expected voltage drop across the leads (not shown) of coil 132 when the shift finger 112 is in the respective L/R, 2/1 or 4/3 X—X selection position. As was the case with the sensor assembly of FIGS. 1 and 2, the position of the ball nuts 110 and 120 and, thus, the corresponding selection and engagement positions of the shift finger 112 may be determined by sensing the value of voltage across the coil leads at a given time after initiation of discharge and comparing same to expected values 140A, 142A or 144A, or by sensing or calculating the instantaneous rate of decay of voltage across the coil leads.

A further embodiment of the present invention as utilized with a single shaft shifting mechanism may be seen by reference to FIGS. 5A, 5B, 6A and 6B. Single shaft shifting mechanisms are known in the prior art, as may be seen by reference to aforementioned U.S. Pat. No. 4,920,815. In the illustrated single shaft shifting mechanism 200, a shift shaft 202 is axially and rotationally movable in a shift housing and carries a shift block member 204 for receipt of a controlling shift finger, such as the end of a manually controlled shift lever or a shift finger of an X-Y shifting mechanism or the like. The shift shaft 202 is rotatably positioned to one of three positions for selecting manipulation of one of three shift yokes, 206, 208 or 210. In each of these selected positions, the selected shift yoke is fixed for axial movement with the shift shaft, while the two non-selected shift yokes are freed for axial movement relative to the shaft but are axially fixed relative to the transmission housing. Axial movement of the shift shaft 202 will cause the shift shaft 202, the selected shift yoke and the clutch control thereby to move axially for engagement and disengagement of the selected ratios. Accordingly, in a transmission utilizing a single shift shaft mechanism, it is important to sense both the axial and rotational position of the shift shaft.

Figure 5A:
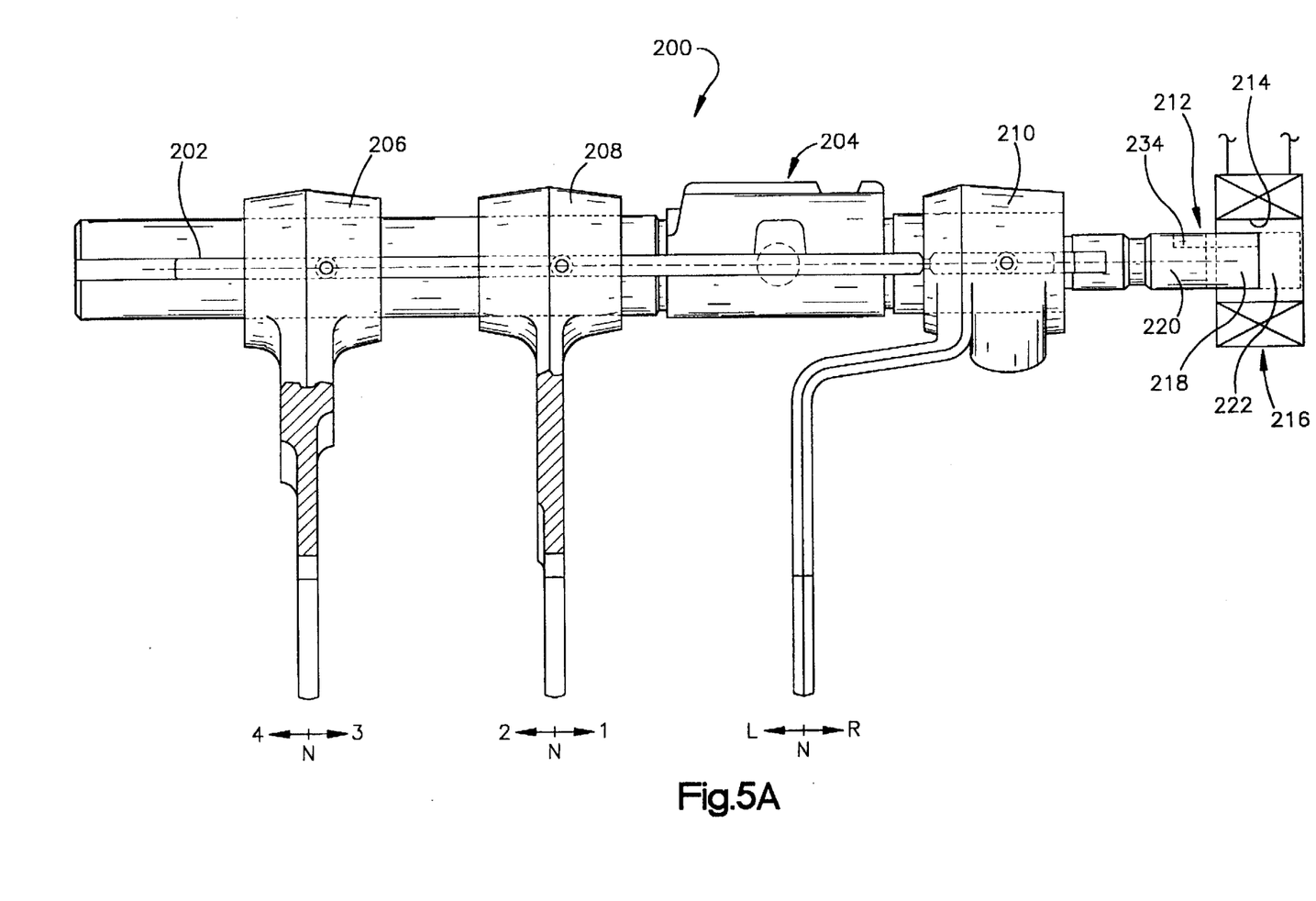
FIG. 5A schematically illustrates the axial position sensor of a third embodiment of the present invention as utilized with a selectively axially and rotationally positioned single shaft shifting mechanism.

In the illustrated embodiment 200, at least the rearward end 212 of the shift shaft 202 is of a ferromagnetic material and is coaxial with the interior bore 214 of an electric coil member 216 substantially structurally and functionally identical to the electric coil member 36 discussed above. The rearward end 212 of the shaft 202 is of a smaller outer diameter than the interior diameter of the coil bore for non-contacting receipt in and/or passage therethrough.

Numeral 218 illustrates the position of the rearward end 212 of shaft 202 in the neutral position, while numerals 220 and 222 illustrate in dotted line the respective positions of the end of the shaft when the selected shift fork is in the fourth, second or low-ratio-engaged position or the third, first or reverse-ratio-engaged position, respectively.

Figure 5B:
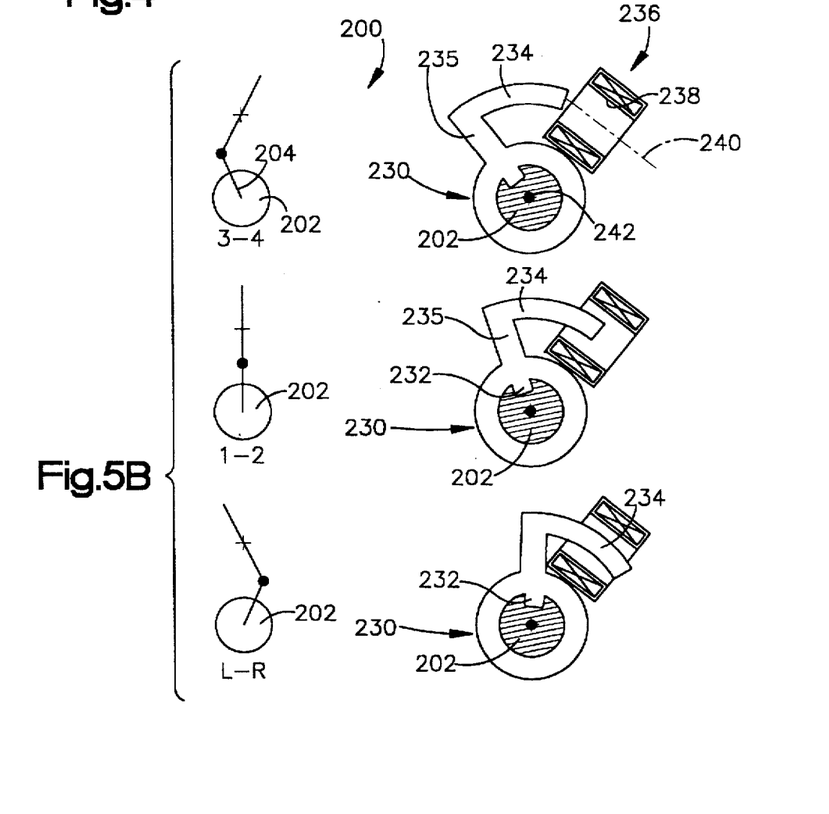
FIG. 5B schematically illustrates the three positions of the rotational position sensor of the embodiment of FIG. 5A.

Referring more particularly to FIG. 5B, it may be seen that a washer member 230 is slidably telescopically received on the rearward end 212 of shaft 202 and carries a radially inwardly extending tab 232 for receipt in an axially extending slot 234 provided in the shaft. Receipt of the tab 232 in the slot 234 allows the shaft 202 to move axially relative to the washer 230 while rotationally fixing the washer to the shaft. The washer 230 carries a generally arcuately shaped cantilevered finger member 234 fixed to the washer by a generally radially outwardly extending tab 235 and extending arcuately spaced from and above a portion of the outer diameter surface thereof. As may be seen schematically in FIG. 5B, a second coil member 236 defines an interior diameter 238 for variable non-contacting receipt of the washer finger member 234, depending upon the rotational position of the shift shaft 202 and the washer member 230 rotationally fixed thereto. The coil member 236 is oriented such that its axis 240 is generally parallel to the arcuate path of finger member 234 for the monitored rotational position of shift shaft 202. Second coil member 236, which is substantially functionally and structurally identical to coil members 34 and 216 described above, of course, must be positioned such that it will not interfere with the axial and/or rotational movement of the shift shaft 202 and the members carried thereby.

Figure 6A:
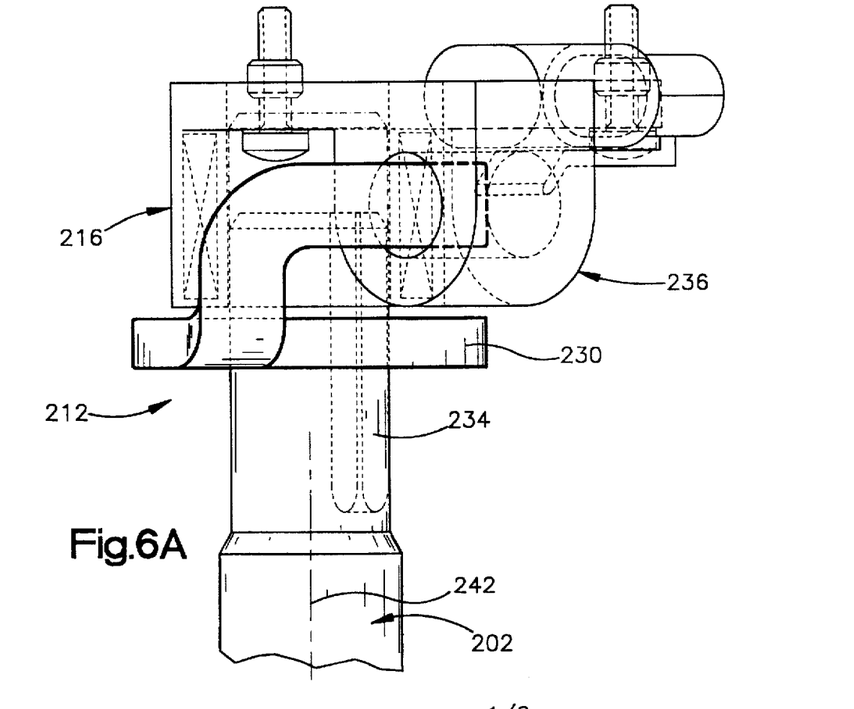
FIGS. 6A and 6B are partial sectional views of the sensor of FIGS. 5A and 5B.
Figure 6B:
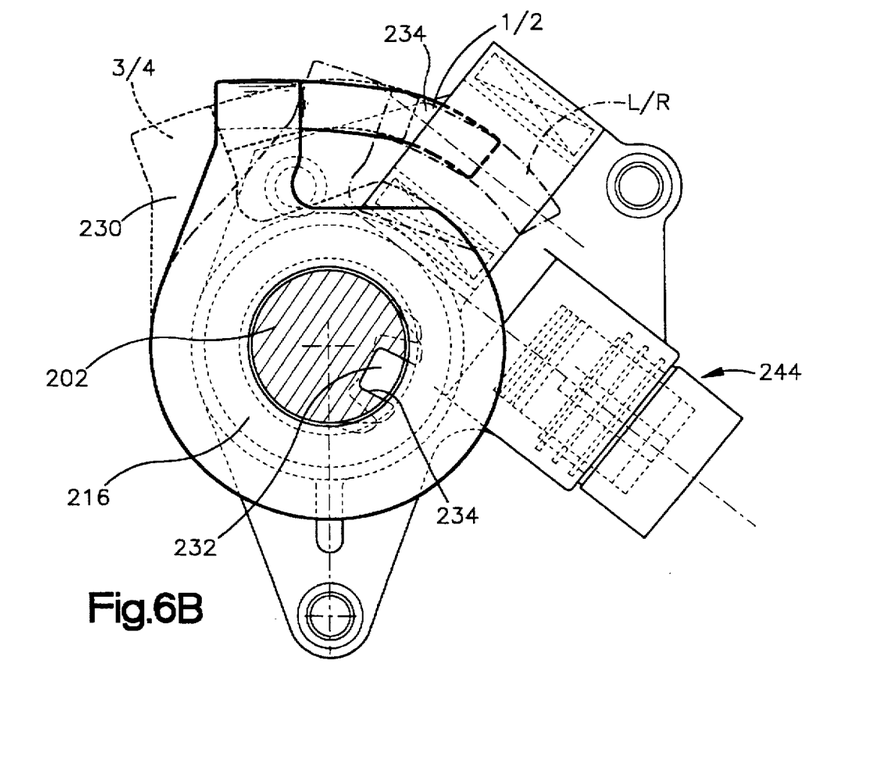

FIGS. 6A and 6B illustrate the structural detail of the proposed single shift shaft position sensing mechanism schematically illustrated in FIGS. 5A and 5B. The electrical connector 244 for connecting the leads to the two coils may be seen by reference to FIG. 6B.

Accordingly, it may be seen that a new and improved transmission shifting mechanism and non-contacting, multiple-position sensor for the transmission shift mechanism is provided.

Although the present invention has been described with a certain degree of particularity, it is understood that the description of the preferred embodiment is by way of example only and that numerous changes to form and detail are possible without departing from the spirit and scope of the invention as hereinafter claimed.

We claim:

1. In combination, a lead screw and nut shift actuator mechanism and nut position sensor assembly, said actuator mechanism comprising a controllable motor for selectively rotating an axially fixed ferromagnetic lead screw, a nut member axially movable on said lead screw to two or more unique axial shifting positions relative to said lead screw, said sensor assembly providing an output signal, the magnitude or rate of change of magnitude of which is indicative of the shifting position of said nut member, said sensor assembly comprising a multiple-winding electrical coil having a bore, a portion of said lead screw passing through said bore, and a magnetic flux insulating tubular sleeve movable with said nut member to a unique sensing position relative to said bore, including at least one unique position wholly or partially within said bore, for each of said unique shifting positions.

2. The combination of claim 1 further comprising means to electrically charge said coil, allow said coil to discharge and, while said coil is discharging, measure the electric charge in said coil, said signal comprising the measured electric charge or rate of change of charge in said coil.

3. The combination of claim 2 wherein said nut is a ball nut.

4. In combination, a single shaft transmission shifting mechanism and position sensor assembly, said shifting mechanism comprising a shaft selectively rotated to two or more unique rotational shifting positions, each corresponding to a unique transmission ratio selection condition and selectively axially moved to three or more unique axial shifting positions, each corresponding to a unique transmission ratio engagement condition, said position sensor assembly comprising:
- a first multiple-winding electrical coil having a first bore and an extension of said shaft movable with changes in axial shifting positions of said shaft to a unique axial sensing position relative to said first bore, including at least two positions at least partially within said first bore, for each of said axial shifting positions,
- a second multiple-winding electrical coil having a second bore and an arcuately movable ferromagnetic member rotationally movable with said shaft to a unique rotational position relative to said second bore, including at least one position within said second bore, for each of said rotational positions, and
- means for periodically independently (1) electrically charging each of said coils, (2) allowing each of said coils to discharge, and (3) while discharging, measuring a value indicative of the electric charge in each of said coils.

5. The combination of claim 4 wherein said extension is of a magnetic flux conducting material.

6. The combination of claim 4 wherein said mechanism has at least three unique rotational shifting positions.

* * * * *